United States Patent
Bendapudi

(10) Patent No.: US 7,814,069 B2
(45) Date of Patent: Oct. 12, 2010

(54) WRAPPER FOR USE WITH GLOBAL STANDARDS COMPLIANCE CHECKERS

(75) Inventor: Jyotsna Bendapudi, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1201 days.

(21) Appl. No.: 11/278,006

(22) Filed: Mar. 30, 2006

(65) Prior Publication Data

US 2007/0260774 A1 Nov. 8, 2007

(51) Int. Cl.
*G06F 17/00* (2006.01)
*G06F 15/16* (2006.01)

(52) U.S. Cl. .................. 707/687; 707/713; 707/759; 707/802; 707/927; 717/141; 717/132; 717/133; 717/146; 717/156; 716/2

(58) Field of Classification Search .............. 717/101, 717/141, 132, 133, 146, 156; 715/237, 240; 707/687, 713–721, 759–768, 802, 809–811, 707/927; 704/1–10; 716/2
See application file for complete search history.

(56) References Cited

U.S. PATENT DOCUMENTS

| | | | | |
|---|---|---|---|---|
| 6,012,155 | A * | 1/2000 | Beausang et al. | 714/727 |
| 6,405,364 | B1 * | 6/2002 | Bowman-Amuah | 717/101 |
| 6,701,345 | B1 * | 3/2004 | Carley et al. | 709/205 |
| 6,839,649 | B2 * | 1/2005 | Kreider | 702/122 |
| 7,036,073 | B2 * | 4/2006 | Jones et al. | 715/237 |
| 7,076,764 | B2 * | 7/2006 | Kramer | 717/120 |
| 7,165,041 | B1 * | 1/2007 | Guheen et al. | 705/26 |
| 2003/0009295 | A1 * | 1/2003 | Markowitz et al. | 702/20 |
| 2003/0074181 | A1 * | 4/2003 | Gharavy | 704/1 |
| 2004/0030963 | A1 * | 2/2004 | Ungar | 714/46 |
| 2004/0117624 | A1 * | 6/2004 | Brandt et al. | 713/166 |
| 2004/0260818 | A1 * | 12/2004 | Valois et al. | 709/229 |
| 2005/0044069 | A1 * | 2/2005 | Geiger et al. | 707/3 |
| 2005/0063545 | A1 * | 3/2005 | Fujimoto et al. | 380/277 |
| 2005/0114240 | A1 * | 5/2005 | Watson-Luke et al. | 705/34 |
| 2005/0114692 | A1 * | 5/2005 | Watson-Luke et al. | 713/200 |
| 2006/0059253 | A1 * | 3/2006 | Goodman et al. | 709/223 |
| 2006/0136863 | A1 * | 6/2006 | Szpak | 717/104 |
| 2006/0161444 | A1 * | 7/2006 | Lubrecht et al. | 705/1 |
| 2006/0161879 | A1 * | 7/2006 | Lubrecht et al. | 717/101 |

(Continued)

OTHER PUBLICATIONS

Marc-Philippe Huget and Michael Wooldridge; "Model Checking for ACL Compliance Verification"; Springer Berlin / Heidelberg; 2004; pp. 75-90.*

(Continued)

*Primary Examiner*—Tony Mahmoudi
*Assistant Examiner*—Dennis Truong
(74) *Attorney, Agent, or Firm*—Aka Chan LLP

(57) ABSTRACT

Methods and apparatus for checking the compliance of a file with global and custom standards are disclosed. According to one aspect of the present invention, a method for checking a file that is associated with a first set of standards and a second set of standards into a repository includes providing the file to a checking arrangement that includes a checking tool and an adapter that is interfaced with the checking tool. The method also includes executing the checking tool to determine compliance of the file with the first set of standards, and executing the adapter to determine compliance of the file with the second set of standards.

22 Claims, 7 Drawing Sheets

U.S. PATENT DOCUMENTS

2006/0282771 A1* 12/2006 Vinci .................. 715/530
2006/0294390 A1* 12/2006 Navratil et al. ............ 713/182
2008/0313736 A1* 12/2008 Baum-Waidner et al. ...... 726/23

OTHER PUBLICATIONS

Emmerich, W. et al.; "Managing standards compliance"; Software Engineering, IEEE Transactions on; 1999; pp. 836-851.*

* cited by examiner

WRAPPER FOR USE WITH GLOBAL STANDARDS COMPLIANCE CHECKERS

BACKGROUND OF THE INVENTION

1. Field of Invention

The present invention relates generally to checking the compliance with standards of files in a web-based application. More specifically, the present invention relates to a custom wrapper which cooperates with a standard global standards compliance checker (GSCC) to check the standards compliance of files.

2. Description of the Related Art

A global standards compliance checker (GSCC) is often utilized as a part of, or in conjunction with, applications to ensure that files such as data files are in compliance with standards. Standards may include "rules" such as a naming convention for file names. If the standards compliancy of a file is not checked, and a file that is not compliant with standards is stored in a repository, substantially anyone with access to the repository has access to the file. Operating on or with a file that is not compliant with standards may compromise the integrity of operations performed using the file. By way of example, if a file that is not compliant with standards is used as the basis for creating a program or an application, the program that is created is likely not to be compliant with standards. Hence, the integrity of the program may be greatly compromised.

Typically, running a global standards compliance check using a GSCC successfully prevents files that are not compliant with global standards from being stored in a repository. Specifically, before a file may be "checked into" or otherwise stored in a repository, a GSCC is often used to determine whether the file is in compliance with standards. As shown in FIG. 1, when a file 102 is to be checked into a repository 106, file 102 is processed by a GSCC 104.

With reference to FIG. 2, a process of utilizing a GSCC will be described. A process 200 of utilizing a GSCC begins at step 202 in which a GSCC is run on a file that is intended to be checked into a repository. Once the GSCC is run, a determination is made in step 204 regarding whether the file passes the GSCC check. That is, it is determined in step 204 if the file is compliant with global standards. If the determination in step 204 is that the file passes the GSCC check, the file is checked into the repository in step 206. Upon checking the file into the repository, the process of utilizing a GSCC is completed.

Alternatively, if it is determined in step 204 that the file does not pass the GSCC check, the indication is that at least some components of the file are not compliant with global standards. Accordingly, process flow moves to step 208 in which the file is rejected for check in, e.g., the file is deemed as being unsuitable for storage in the repository. After the file is rejected for repository check in, the process of utilizing a GSCC file is completed.

While a GSCC is suitable for use in checking standards compliancy of files prior to storing the files in a repository, it is often necessary to update the standards that a GSCC may check for. In other words, a GSCC generally must be updated whenever files that are to be checked using the GSCC have specialized standards, if compliance with substantially all standards associated with the file are to be checked. FIG. 3 is a block diagram representation of a system in which an updated GSCC is used to check the standards compliance of a file created using a program with specialized standards. When a file 302 created by a program 308 which has specialized standards, i.e., standards which are not part of an existing GSCC, is to be checked into a repository 306, an updated GSCC 304 is obtained and used to check the specialized standards. Updated GSCC is arranged to check file 302 for compliance with specialized standards.

Referring next to FIG. 4, one method of ensuring that a GSCC may be used with files generated by a particular program will be described. A process 400 of ensuring that a GSCC is suitable for use with a program begins at step 402 in which it is determined whether a program that generates or includes files that are to be checked with a GSCC has program-specific standards. In other words, it is determined in step 402 if a GSCC needs to be modified to check standards associated with the program.

If the determination is that a program has no program-specific standards, then the indication is that a standard GSCC, e.g., an existing GSCC, may be used. Accordingly, in step 410, an existing GSCC is used to check the compliance of program files that are to be checked into a repository, and the process of ensuring that a GSCC is suitable for use is completed.

Alternatively, if the determination in step 402 is that a program has program-specific standards, the implication is that a standard GSCC will need to be updated to accommodate the program-specific standards. Hence, from step 402, process flow moves to step 404 in which access to the GSCC is obtained. Obtaining access to the GSCC may involve contacting a provider of the GSCC, or obtaining source code associated with the GSCC. Once access to the GSCC is obtained, the GSCC is effectively recoded in step 406 to account for the program-specific standards. After the GSCC is recoded, the recoded GSCC may be used in step 408 to check compliance of files associated with the program before check in, and the process of ensuring that a GSCC is suitable for use is completed. Often, using the recoded GSCC includes ensuring that the recoded GSCC is still compatible with an overall system.

The need to update a GSCC to accommodate each new standard that is to be checked may be both time intensive and inefficient. Updating a GSCC is often time consuming, as a customer of a GSCC application may need to contact the supplier of the GSCC to update the GSCC. Further, once the updated version of a GSCC is received by a customer, the customer may need to determine whether the updated GSCC is compatible with his or her overall system. Such a determination may also be time consuming, and may affect the performance of the overall system if the overall system is taken offline during the determination.

Therefore, what is needed is a method and an apparatus which allows new or specialized standards to be readily incorporated with a global standards compliance check process. That is, what is desired is a system which allows the compliance of a file to standards which are not included in a GSCC to be efficiently checked.

SUMMARY OF THE INVENTION

The present invention relates to assessing compliance of a file with a set of global standards and a set of custom standards. According to one aspect of the present invention, a method for checking a file that is associated with a first set of standards and a second set of standards into a repository includes providing the file to a checking arrangement that includes a checking tool and an adapter that is interfaced with the checking tool. The method also includes executing the checking tool to determine compliance of the file with the first set of standards, and executing the adapter to determine compliance of the file with the second set of standards.

In one embodiment, the method also includes determining if the first file is compliant with the first set of standards and the second set of standards, and storing the file into the repository when the first file is compliant with the first set of standards and the second set of standards. In another embodiment, the checking tool is a global standards compliance checker (GSCC).

Augmenting functionality included in checking tools with a wrapper or an adapter that has functionality to check a custom set of standards allows standards compliance to be efficiently checked. Functionality to check a standard set of standards is provided by the checking tool, and may effectively be used by any number of wrappers which provide functionality to check different sets of standards. The use of wrappers essentially eliminates the need to recode or rewrite a checking tool such as a GSCC each time compliance of a file, e.g., a file used by a program or created by a program, with at least one additional standard needs to be ascertained.

According to another aspect of the present invention, an adapter includes a first interface, a second interface, and a compliance checker. The first interface receives a file as an input, while the second interface provides an interface with a checking tool that has functionality to determine compliance of the file with a first set of standards. The second interface also obtains an indication from the checking tool regarding the compliance of the file with the first set of standards. The compliance checker being determines compliance of the file with a second set of standards. In one embodiment, the compliance checker also indicates if the file is compliant with the first set of standards and the second set of standards.

In accordance with yet another aspect of the present invention, a method for processing a first file that is associated with a first set of standards and a second set of standards includes receiving the file as an input, accessing a checking tool, and determining whether the file is compliant with the second set of standards. Accessing the checking tool includes obtaining an indication of whether the file is compliant with the first set of standards. In one embodiment, if the indication is that the file is compliant with the first set of standards, and if the file is complaint with the second set of standards, the method also includes providing an indication that the file is compliant with the first set of standards and the second set of standards.

According to still another aspect of the present invention, a method for implementing a wrapper arranged to wrap a checking tool that determines compliance of a file with a first set of standards includes identifying a second set of standards associated with the file, providing functionality in the wrapper to determine compliance of the file with the second set of standards in the wrapper, and interfacing the wrapper with the checking tool. In one embodiment, interfacing the wrapper with the checking tool allows the checking tool to access the functionality in the wrapper.

These and other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to network database applications, the invention may be advantageously applied to any software application. Therefore, the description of the embodiments that follows is for purposes of illustration and not limitation.

Checking the compliance of a file with standards before storing the file in a repository is crucial to maintain the integrity of applications or files that may build on or use the file. Global standards compliance checkers (GSCCs) are often used to check the standards compliance of files before the files may be checked into a repository. While effective, GSCCs typically must be updated when compliance with new or custom standards is to be checked. Recoding or rewriting GSCCs to account for new or custom standards is often time consuming and, hence, inefficient.

Creating a wrapper for a GSCC that provides the functionality to perform standards compliance checks on new or custom standards allows standards compliance to be checked without causing a GSCC to be recoded. Further, the use of a wrapper allows the functionality of a GSCC to be used. As will be appreciated by those skilled in the art, a wrapper acts as an interface between a caller and code that is wrapped. Often, a wrapper is used to enable a program written in a particular programming language to use different calling conventions. A wrapper may also allow a program to be used with a scripting language. A wrapper or an adapter may support coding standards used in JAVA xml, JRAD xml, and Perl that may not typically be supported by a standard GSCC. A wrapper may be created or updated relatively efficiently. Substantially any time compliance to new standards is to be checked, a wrapper may be created or updated.

In one embodiment, a standards wrapper/adapter may be implemented using at least one of Perl scripts and xml files. A standards wrapper/adapter may be arranged to be used such that once a GSCC checks for standards compliance, the standards wrapper/adapter is used to check the compliance to standards that are not incorporated into the GSCC. It should be appreciated, however, that the standards wrapper/adapter may instead check for compliance to standards before a GSCC is used or while a GSCC is used. In any case, a standards wrapper/adapter allows the functionality provided by an existing standards checking engine, as for example a GSCC, to be used to check the overall standards compliance of a file with custom standards.

Figure 1:
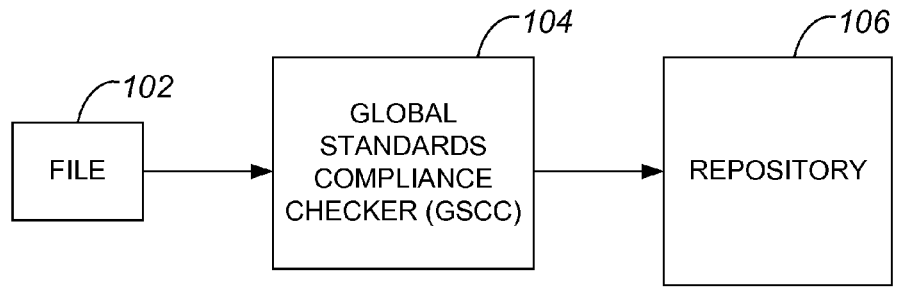
FIG. 1 is a block diagram representation of a system in which a global standards compliance checker (GSCC) is used.
Figure 2:
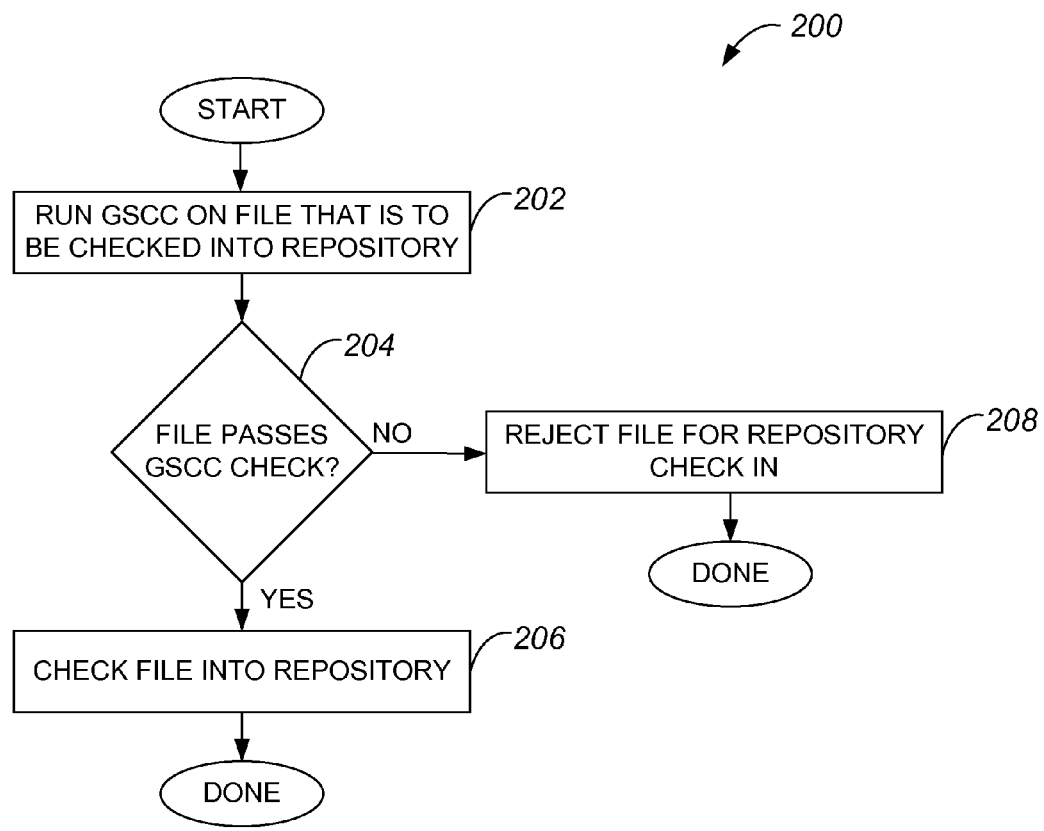
FIG. 2 is a process flow diagram which illustrates steps associated with one method of using a GSCC.
Figure 3:
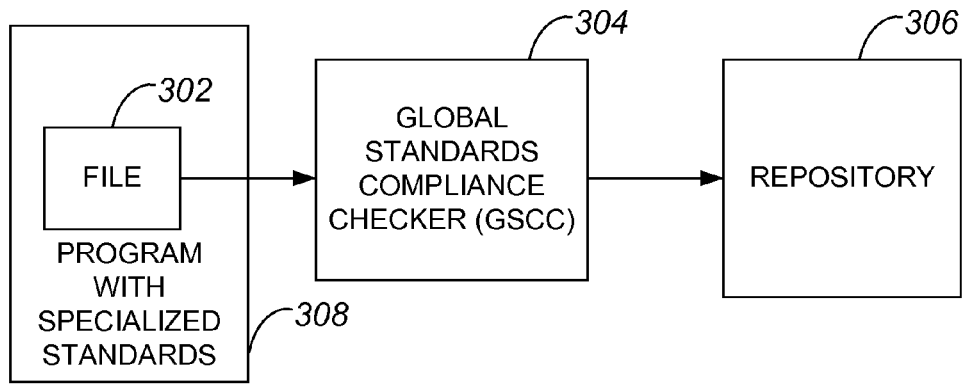
FIG. 3 is a block diagram representation of a system in which an updated GSCC is used to check the standards compliance of a file created using a program with specialized standards.
Figure 4:
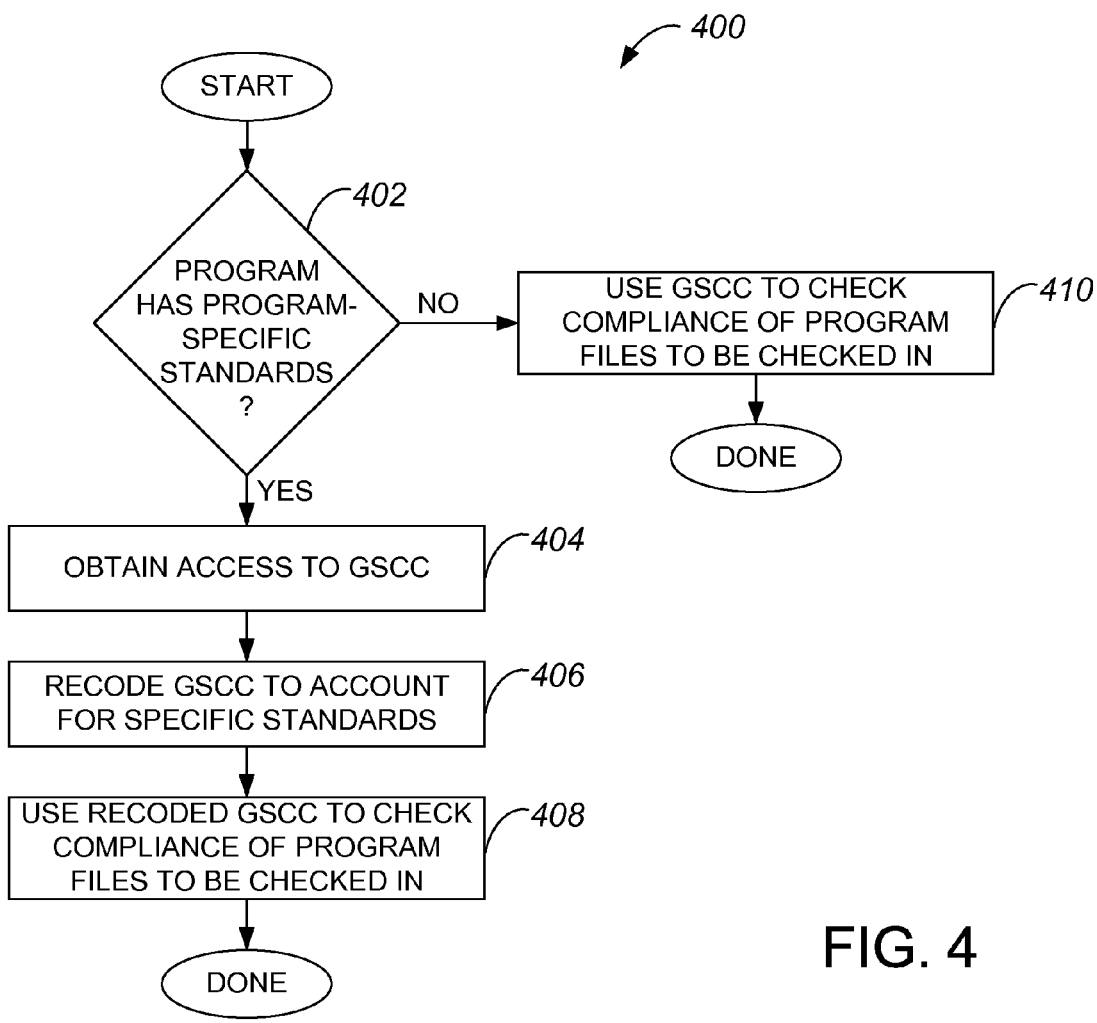
FIG. 4 is a process flow diagram which illustrates steps associated with ensuring that a GSCC is compatible for use with a particular program.
Figure 5:
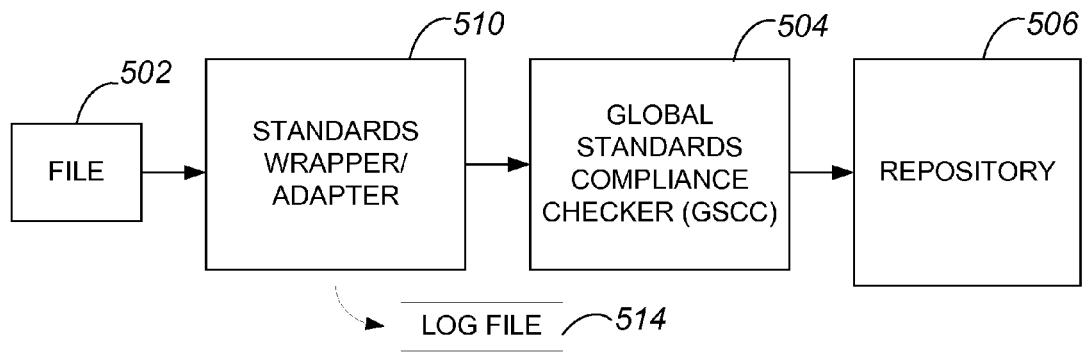
FIG. 5 is a block diagram representation of a system which includes a standards wrapper/adapter and a GSCC in accordance with an embodiment of the present invention.

With reference to FIG. 5, a system which utilizes a GSCC and a standards/wrapper adapter will be described in accordance with an embodiment of the present invention. When a file 502 is to be checked into a repository 506, the standards compliance of file 502 is typically checked. It should be appreciated that although one file 502 is described, any number of files may be checked into repository 506. That is, one file 502 or a plurality of files may be processed to determine standards compliance. A GSCC 504 generally includes functionality to check for compliance with a set of standard standards, while a standards wrapper/adapter 510 may include functionality to check for compliance with substantially any standards which are not accounted for by GSCC 504. Standards wrapper/adapter 510 is arranged to interface with GSCC 504. In one embodiment, standards wrapper/adapter 510 wraps GSCC 504.

GSCC 504 may be arranged to be accessed, or run, from a command line that allows for a selection to be made as to a file 502 that is to be checked. In general, file 502 may be located substantially anywhere on a database system or a file system. GSCC 504 may be arranged to allow parameters to be set that affect how GSCC 504 runs, as well as how reports that are generated by GSCC 504 are arranged, e.g., in terms of content and layout.

Before file 502 is checked into repository 506, file 502 is processed by both standards wrapper/adapter 510 and global standards compliance checker 504 to determine whether file 502 is compliant with standards. If file 502 is determined to be compliant with standards, then file 502 may be checked into repository 506. Running, executing, or invoking standards wrapper/adapter 510 may include running a script associated with standards wrapper/adapter 510, and identifying file 502 as an input to the script. In one embodiment, standards wrapper/adapter 510 may cause at least one log file 514 to be generated. Log file 514 may include a listing of errors such as errors associated with a lack of compliance to global and specialized standards. Log file 514 may list errors along with a corresponding line numbers associated with a locations of the errors in file 502, along with a name of file 502. Although log file 514 may list errors in substantially any format, suitable formats may include, but are not limited to, HTML, XML, and TXT formats.

Figure 6:
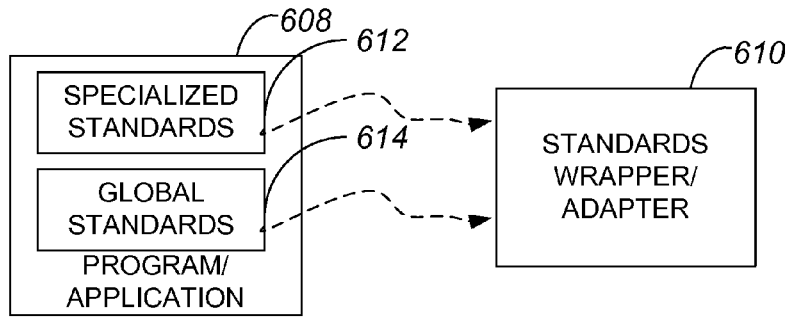
FIG. 6 is a block diagram representation of specialized standards of a program or an application being incorporated into a standards wrapper/adapter in accordance with an embodiment of the present invention.

Certain programs or applications may include a set of specialized standards that are used to create a file or are associated with a file. FIG. 6 is a block diagram representation of specialized standards of a program or an application being incorporated into a standards wrapper/adapter in accordance with an embodiment of the present invention. A program or application 608, which may be a database application or a web-based application, has specialized standards 612 associated therewith. Program 608 may also generally have global standards 614 associated therewith, as well. In one embodiment, program 608 is associated with an enterprise management system. Functionality that allows compliance with the specialized standards 612 to be checked is incorporated into standards wrapper/adapter 610. That is, standards wrapper/adapter 610 is written or otherwise created such that when a file that is to be checked for standards compliance in provided as an input to standards wrapper/adapter 610, standards wrapper/adapter 610 has knowledge of specialized standards 612 and may perform a standards compliance check. A wrapper such as standards wrapper/adapter 610 may generally be used substantially anytime during development to effectively ensure that standards and specialized or customized standards, as well as to generate a log file for tracking errors.

Figure 7:
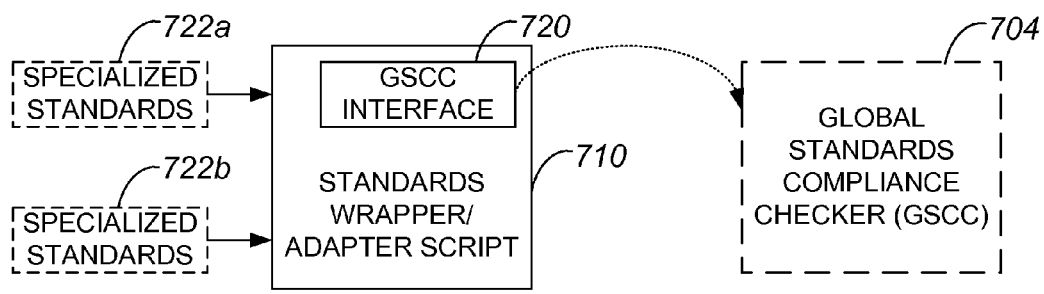
FIG. 7 is a block diagram representation of an interface between script associated with a standards wrapper/adapter and a GSCC in accordance with an embodiment of the present invention.

A standards wrapper/adapter may generally be implemented as a script, e.g., a Perl script. In one embodiment, a relatively generic standards wrapper/adapter script may be provided such that a developer may augment the script using information associated with specialized standards. Referring next to FIG. 7, a standards wrapper/adapter script will be described in accordance with an embodiment of the present invention. A standards wrapper/adapter script 710 is generally written to include a GSCC interface 720 that allows standards wrapper/adapter script 710 to be interfaced with GSCC 704. GSCC interface 720 may allow standards wrapper/adapter script 710 to call GSCC 704.

Standards wrapper/adapter script 710 is configured to allow specialized standards 722a, 722b to be incorporated therein. That is, standards wrapper/adapter script 710 is scripted either to allow portions of standards wrapper/adapter script 710 to be rescripted to accommodate specialized standards 722a, 722b, or to allow scripts written to accommodate specialized standards 722a 722b to be called by standards wrapper/adapter script 710.

Figure 8A:
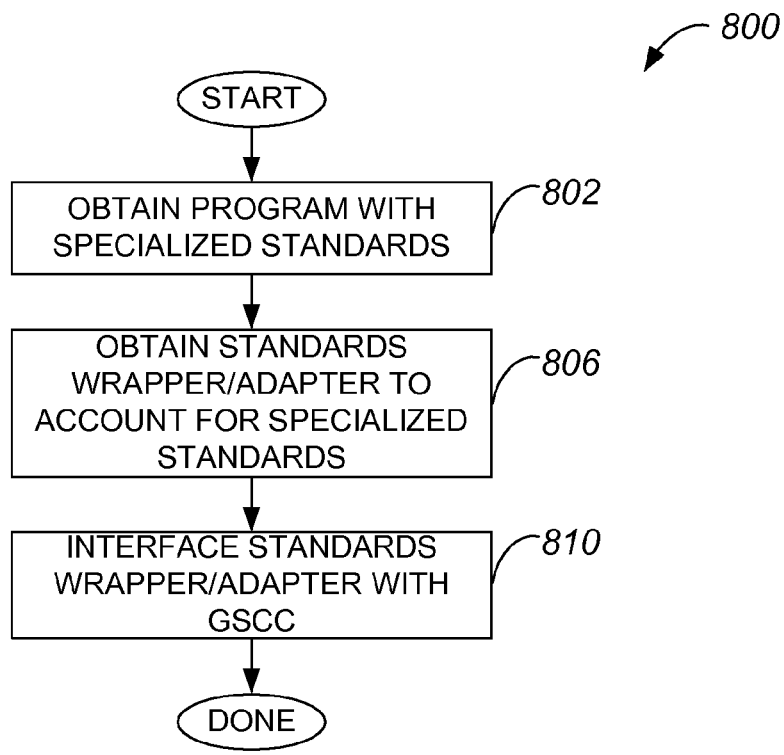
FIG. 8A is a process flow diagram which illustrates one method of setting up a system to enable the standards compliance of a file associated with a program that has specialized standards to be checked in accordance with an embodiment of the present invention.

When a program or an application has a custom set of standards that are not accounted for in a GSCC, an overall system that includes the program and the GSCC may be configured such that a file created by or associated with the program is inputted to a standards wrapper/adapter and the GSCC. FIG. 8A is a process flow diagram which illustrates a method of setting up a system to check the standards compliance of a file associated with a program that has specialized standards in accordance with an embodiment of the present invention. A process 800 of setting up a system begins at step 802 in which a program with specialized standards is obtained. Obtaining the program may include obtaining a list of the standards associated with the program. After obtaining the program, a standards wrapper/adapter that accounts for the specialized standards is obtained in step 806. The standards wrapper/adapter that accounts for the specialized standards is arranged to interface with a GSCC. That is, the standards wrapper/adapter generally includes an interface that allows the standards wrapper/adapter to cooperate with the GSCC to perform standards compliance checks. The steps associated with obtaining a standards wrapper/adapter will be described below with reference to FIG. 8B and FIG. 8C.

Once the standards wrapper/adapter is obtained, the standards wrapper/adapter is interfaced with a GSCC in step 810.

Interfacing the standards wrapper/adapter to the GSCC may include utilizing hooks in the GSCC to effectively integrate the standards wrapper/adapter with the GSCC. Upon interfacing the standards wrapper/adapter with the GSCC, the process of setting up a system is completed.

Figure 8B:
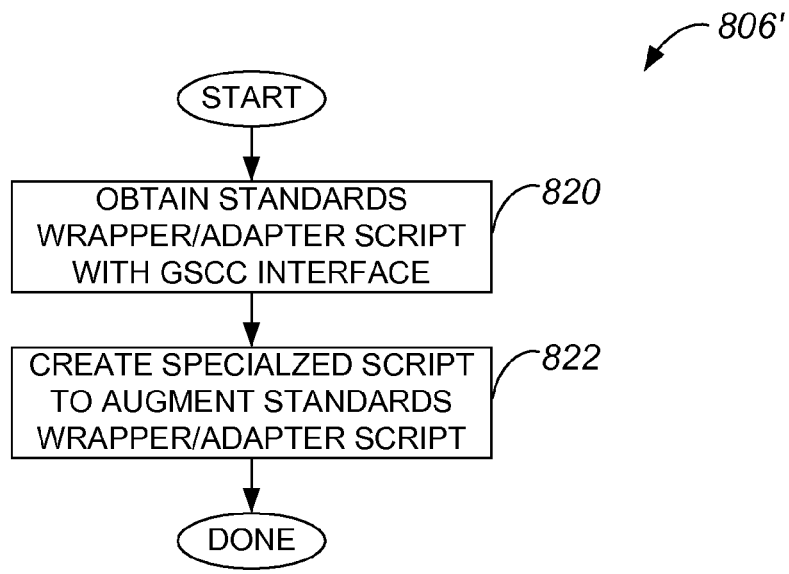
FIG. 8B is a process flow diagram which illustrates steps associated with a first method of obtaining a standards wrapper/adapter, e.g., step 806 of FIG. 8A, in accordance with an embodiment of the present invention.

With reference to FIG. 8B, one method of obtaining a standards wrapper/adapter will be described in accordance with an embodiment of the present invention. A process 806' of obtaining a standards wrapper/adapter begins at step 820 in which script or code associated with a standards wrapper/adapter is obtained. In general, the script may be a Perl script, although it should be appreciated that the script may be created using any suitable programming language. The script, which may be provided by a provider of a GSCC to which the standards wrapper/adapter is to be interfaced, generally includes a GSCC interface. In addition, the script may include sections that may be augmented or altered by a customer. Specialized script may be created in step 822 to augment the standards wrapper/adapter script. In the described embodiment, the specialized script is arranged to contain functionality to check specialized standards associated with a program. Once the standards wrapper/adapter script has been augmented, the process of obtaining a standards wrapper/adapter is completed.

Figure 8C:
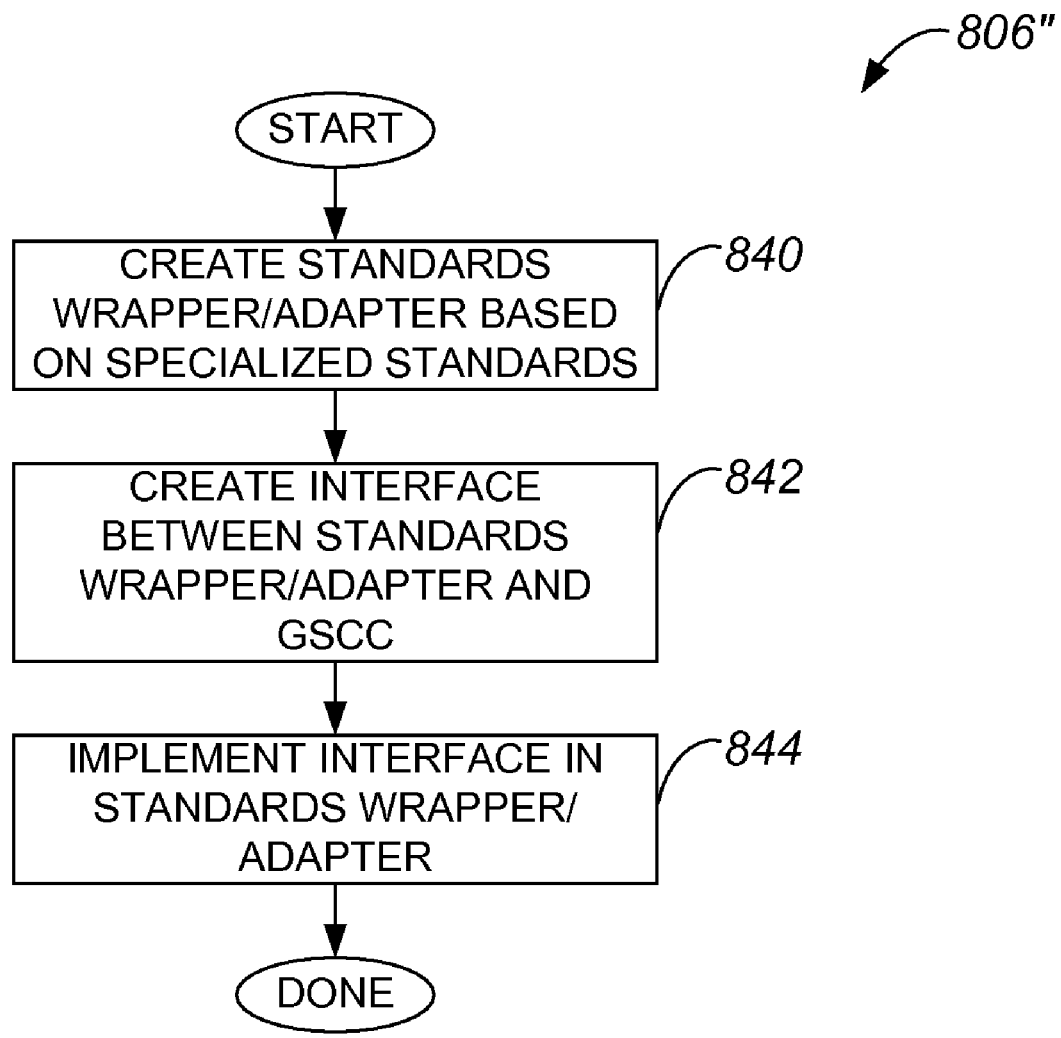
FIG. 8C is a process flow diagram which illustrates steps associated with a second method of obtaining a standards wrapper/adapter, e.g., step 806 of FIG. 8A, in accordance with an embodiment of the present invention.

In lieu of utilizing effectively standard standards wrapper/adapter script to create a standards wrapper/adapter, a standards wrapper/adapter may be created without using pre-existing script. FIG. 8C is a process flow diagram which illustrates steps associated with a method of obtaining a standards wrapper/adapter that does not use pre-existing script in accordance with an embodiment of the present invention. A process 806" of obtaining a standards wrapper/adapter begins at step 840 in which a standards wrapper/adapter is created based on specialized standards. Creating a standards wrapper/adapter may include using any suitable programming language, e.g., Perl or Java.

After the standards wrapper/adapter is created to enable compliance with specialized standards to be checked, an interface between the standards wrapper/adapter and a GSCC is created in step 842. The interface is then implemented or incorporated into the standards wrapper/adapter in step 844, and the process of obtaining a standards wrapper/adapter is completed.

Figure 9:
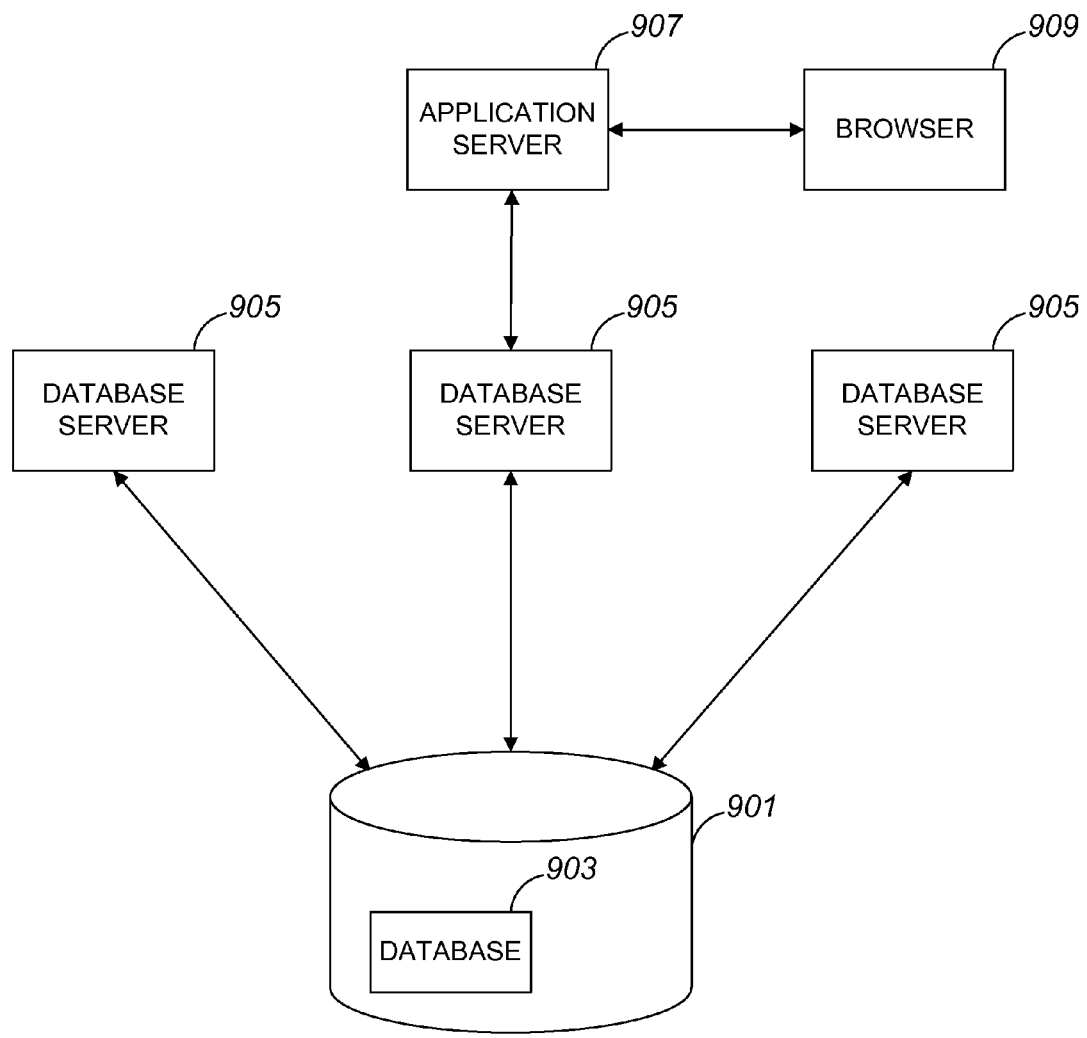
FIG. 9 is a block diagram representation of a database management system architecture.

A standards wrapper/adapter may generally be implemented with respect to a database management system. One suitable database management system architecture is the three-tiered architecture that is shown in FIG. 9. At the core of a database management system is a central storage 901 that stores a database 903 or a repository. Database 903 is typically stored on one or more hard drives, and is typically part of a larger computer system. The information may be stored on database 903 in a variety of formats with relational database management systems relying heavily on tables to store the information. Database servers 905 are instances of a program that interacts with database 903. Each instance of a database server 905 may, among other features, independently query database 903 and store information therein.

In some instances, database servers 905 may not include user friendly interfaces, such as graphical user interfaces. Accordingly, at least one application server 907 may provide the user interfaces to database servers 905. By way of example, application server 907 may be a web application server on the Internet, or any other network. Application server 907 may provide user friendly mechanisms for accessing database 903 through database servers 905. A web browser 909 may be utilized to access application server 907.

Figure 10:
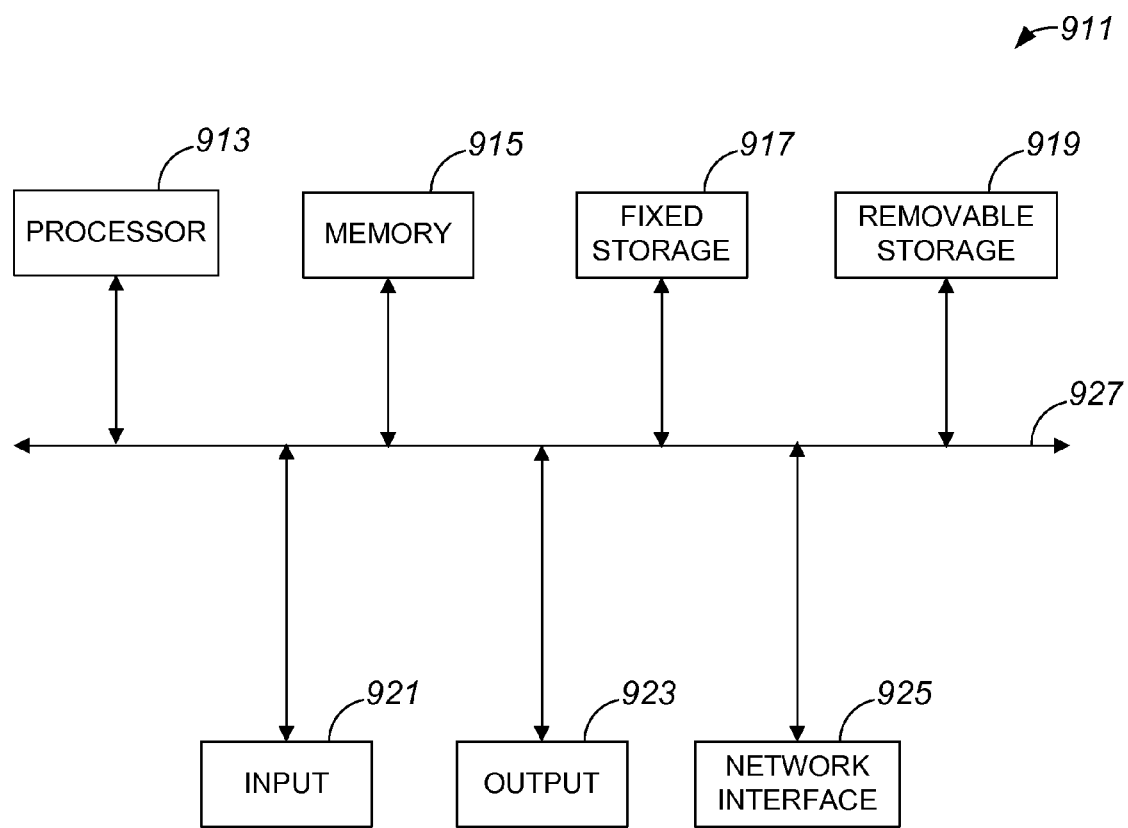
FIG. 10 is a block diagram representation of a computing system that may be utilized in association with the embodiments of the present invention.

FIG. 10 shows a block diagram of components that may be present in computer systems that implement embodiments of the invention. A computer system 911 includes a processor 913 that executes instructions from computer programs, including operating systems. Processor 913 may be utilized to enable a GSCC to run. Although processor 913 typically has memory caches, processor 913 may utilize memory 915, which may store instructions or computer code and data.

A fixed storage 917 may store computer programs and data such. Fixed storage 917 is typically persistent and provides more storage when compared to memory 915. A common fixed storage 917 for databases is multiple, e.g., arrays, hard drives. A removable storage 919 provides mobility to computer programs and/or data that are stored thereon. Removable storage 919 may include, but is not limited to, floppy disks, tape, CD/ROM, DVD, flash memory devices, and the like.

Memory 915, fixed storage 917, and removable storage 919 provide examples of computer readable storage media that may be utilized to store and retrieve computer programs incorporating computer codes that implement the invention, data for use with the invention, and the like. An input device 921 allows a user to interface with computer system 911. Input device 921 may be a keyboard, a mouse, buttons, dials, or any other suitable input mechanism. An output device 923 allows system 911 to provide output to the user. Output device 923 may include devices such as monitors, display screens, LEDs, printers, or substantially any other output mechanism.

A network interface 925 allows system 911 to interface with a network to which it is connected. The system bus architecture of computer system 911 is represented by arrows 927. The components shown in FIG. 10 may be found in many computer systems. However, components may be added, deleted, and combined without departing from the spirit or the scope of the present invention. For example, fixed storage 917 may be a file server that is accessed through a network connection. Thus, FIG. 10 is for illustration purposes and not limitation.

Although only a few embodiments of the present invention have been described, it should be understood that the present invention may be embodied in many other specific forms without departing from the spirit or the scope of the present invention. By way of example, a standards wrapper/adapter may be arranged as a part of a framework that enables code or script including custom standards to be plugged into the standards wrapper/adapter. In other words, functionality that checks compliance to custom standards may be created as a pluggable adapter that may be plugged into a standards wrapper/adapter which serves as an interface between the pluggable adapter and a GSCC. Within such a framework, a standards wrapper/adapter may also be arranged to be interfaced with more than one GSCC such that a single pluggable adapter may effectively be used with a set of different GSCCs.

In one embodiment, a standards wrapper/adapter may be arranged to be interfaced with more than one GSCC. That is, a standards wrapper/adapter may be coded such that it includes different interfaces that may be used with different GSCCs. In such an embodiment, the functionality to check the compliance of files to custom standards may be used with different GSCCs substantially without having to create different standards wrapper/adapters that are suitable for use with each different GSCC.

While a GSCC has been described as being suitable for use with a standards wrapper/adapter, substantially any suitable checking application may be used with a wrapper/adapter.

That is, wrappers that augment the checking ability of a checking tool may be used with a variety of different checking tools.

A standards wrapper/adapter may generally be arranged such that when a GSCC is called, the standards wrapper/adapter is substantially automatically called. Alternatively, a system may be arranged such that a standards wrapper/adapter is called when a file is to be checked. The standards wrapper/adapter may then call a GSCC without departing from the spirit or the scope of the present invention.

A standards wrapper/adapter may be arranged to perform a variety of other functions in addition to performing checks of standards compliance. For instance, a standards wrapper/adapter may be arranged to create a log file that details why a file did not pass a standards compliance check. Such a log file may be accessed by a developer, or even sent via an electronic mail message to a developer.

A GSCC may be a stand alone application, or may be incorporated into a part of another application or tool. An application or tool that a GSCC may be a part of is a checking tool that is used to verify the integrity of a file. In general, a GSCC and a standards wrapper/adapter may be a part of an enterprise management system.

In general, the steps associated with methods of the present invention may vary widely. Steps may be added, removed, altered, combined and reordered without departing from the spirit or the scope of the present invention. Therefore, the present examples are to be considered as illustrative and not restrictive, and the invention is not to be limited to the details given herein, but may be modified within the scope of the appended claims.

The invention claimed is:

1. A method for checking a file into a repository, the file being associated with a first set of standards and a second set of standards, the method comprising:
   providing the file to a checking arrangement, the checking arrangement including a checking tool and an adapter, the adapter being implemented as a first script and interfaced with the checking tool;
   executing the adapter, the adapter being arranged to determine compliance of the file with the second set of standards;
   after the executing the adapter, calling the checking tool via the adapter's interface to the checking tool from the adapter, the checking tool being implemented as code;
   after the calling the checking tool, executing the checking tool, the checking tool being arranged to determine compliance of the file with the first set of standards and not arranged to determine compliance of the file with the second set of standards;
   while executing the checking tool, using the checking tool to determine compliance of the file with the first set of standards;
   while executing the adapter, using the adapter to determine compliance of the file with the second set of standards;
   modifying an adapter script so the adapter is arranged to determine compliance of the file with a third set of standards in addition to the second set of standards, wherein the third set of standards is different from the first and second set of standards; and
   without recompiling the code of the checking tool after modifying the adapter script, while executing the adapter, using the adapter to determine compliance of the file with the third set of standards.

2. The method of claim 1 further including:
   determining if the file is compliant with the first set of standards and the second set of standards;
   if it is determined that the file is compliant with the first set of standards and the second set of standards, storing the file into the repository
   if it is determined that the file is not compliant with the first set of standards and compliant with the second set of standards, not storing the file into the repository;
   if it is determined that the file is compliant with the first set of standards and not compliant with the second set of standards, not storing the file into the repository; and
   if it is determined that the file is not compliant with the first set of standards and not compliant with the second set of standards, not storing the file into the repository.

3. The method of claim 1 wherein determining compliance of the file with the first set of standards occurs during the determining compliance of the file with the second set of standards.

4. The method of claim 1 comprising:
   if it is determined that the file is not compliant with the first set of standards, creating a log file of the errors associated with the lack of compliance of the file with the first set of standards, wherein the log file comprises a listing of errors and corresponding line numbers for each error in the file.

5. The method of claim 1 wherein determining that the file is compliant with the first set of standards and the second set of standards, causing a database application to read the file as input.

6. The method of claim 1 wherein the adapter calls a second script, the second script being arranged to determine compliance of the file with a fourth set of standards.

7. The method of claim 1 wherein without recompiling the code of the checking tool after modifying the adapter script, determining compliance of the file with the third set of standards occurs before the determining compliance of the file with the first and second set of standards.

8. A computer program product, stored on a computer readable storage medium, executable by a computer, for checking a file into a repository, the file being associated with a first set of standards and a second set of standards, the computer program product comprising:
   computer code that provides the file to a checking arrangement, the checking arrangement including a checking tool and a first adapter, the first adapter being interfaced with the checking tool;
   computer code that causes the checking tool to be executed, wherein executing the checking tool comprises determining compliance of the file with the first set of standards;
   computer code that causes the first adapter to be executed, wherein executing the first adapter comprises determining compliance of the file with the second set of standards;
   computer code that determines that when the file is not in compliance with the first and second set of standards, and causes a second adapter to be executed, wherein executing the second adapter comprises determining compliance of the file with the third set of standards which is different from the first and second set of standards;
   computer code that determines that when the file is in compliance with either or both the first and second set of standards, and not causing a second adapter to be executed,
   computer code that causes a first adapter script to be modified so the first adapter is arranged to determine compliance of the file with a fourth set of standards in addition to the second set of standards, wherein the fourth set of standards is different from the first and second set of standards; and computer code that causes, without recompiling code of the checking tool after the first adapter script is modified, while executing the first adapter, the first adapter to be used to determine compliance of the file with the fourth set of standards.

9. The computer program product of claim 8 further including:

computer code that causes a determination of whether the first file is compliant with the first set of standards and the second set of standards; and computer code that causes, if it is determined that the first file is compliant with the first set of standards and the second set of standards, the file to be stored into the repository.

10. An adapter, the adapter comprising:

means for receiving a first file as an input and loading into a first computer memory;

means for interfacing with a checking tool, the checking tool having functionality to process the first file loaded in the first computer memory to determine compliance of the first file with a first set of standards and not having functionality to determine compliance of the first file with a second set of standards which is different from the first set of standards;

means for adding the second set of standards to the adapter, wherein after the second set of standards to the adapter is added to the adapter, the adapter with the added second set of standards to the adapter is stored in a second computer memory and is arranged to process the first file loaded in the first computer memory to determine compliance of the first file with the second set of standards;

means for, after adding the second set of standards to the adapter, determining compliance of the first file with the second set of standards;

means for obtaining information from the checking tool regarding the compliance of the first file with the first set of standards;

means for after storing the adapter with the added second set of standards in the second memory, the adapter can determine compliance of a second file, subsequent to the first file, without needing to add the second set of standards to the adapter again;

means for modifying an adapter script so the adapter is arranged to determine compliance of the file with a third set of standards in addition to the second set of standards, wherein the third set of standards is different from the first and second set of standards; and means for, while executing the adapter, using the adapter to determine compliance of the file with the third set of standards, without recompiling the checking tool after the adapter script has been modified.

11. The adapter of claim 10 wherein the means for adding the second set of standards to the adapter comprises augmenting at least one section of a script of the adapter.

12. An adapter, the adapter comprising:

a first interface stored in a computer memory, the first interface being arranged to receive a file as an input;

a second interface stored in the computer memory, the second interface being arranged to interface with a checking tool, the checking tool having functionality to determine compliance of the file with a first set of standards and not having functionality to determine compliance of the file with a second set of standards, the second interface further being arranged to obtain an indication from the checking tool regarding the compliance of the file with the first set of standards;

a compliance checker, the compliance checker being arranged to determine compliance of the file with the second set of standards and not being arranged to determine compliance of the file with the first set of standards, wherein the compliance checker calls the checking tool via the second interface stored in the computer memory to determine compliance of the file with the first set of standards; and an arrangement, the arrangement being arranged to be updated to determine compliance of the file with a third set of standards by augmenting a script of the adapter without modifying binary code associated with the checking tool and without recompiling the code of the checking tool after modifying the adapter script, wherein the third set of standards is different from the first and second set of standards.

13. The adapter of claim 12 wherein the compliance checker is implemented as a script stored in fixed storage, different from the computer memory.

14. The adapter of claim 12 wherein the compliance checker determines compliance of the file with the second set of standards while the checking tool determines compliance of the file with the first set of standards.

15. The adapter of claim 12 wherein the checking tool is accessed from a command line that allows a user to specify the file as a parameter.

16. A method for processing a first file, the first file being associated with a first set of standards and a second set of standards, the method comprising:

receiving the file as an input;

accessing a checking tool, wherein accessing the checking tool includes obtaining an indication of whether the file is compliant with the first set of standards;

providing a wrapper to the checking tool, stored in fixed storage that is accessible by a computer processor, wherein the wrapper is capable of being modified to add additional sets of standards other than the first and second set of standards;

in the computer processor, executing the checking tool to determine whether the file is compliant with the first set of standards;

after executing the checking tool to determine whether the file is compliant with the first set of standards, using the checking tool, calling the wrapper to the checking tool to determine whether the file is compliant with the second set of standards;

modifying the wrapper to the checking tool to include a third set of standards, different from the first and second set of standards; and after modifying the wrapper to the checking tool to include a third set of standards and without modifying the checking tool, and using the checking tool, calling the wrapper to the checking tool to determine whether the file is compliant with the third set of standards.

17. The method of claim 16 wherein determining compliance of the file with the first set of standards occurs during the determining compliance of the file with the second set of standards.

18. A method comprising:

receiving the file as an input, wherein the first file is associated with a first set of standards and a second set of standards;

accessing a checking tool;

providing a wrapper to the checking tool, stored in fixed storage that is accessible by a computer processor, wherein the wrapper is capable of being modified to include additional sets of standards other than the first and second set of standards;

determining whether the file is compliant with the first set of standards;

determining whether the file is compliant with the second set of standards;

modifying the wrapper to the checking tool to include a third set of standards, different from the first and second set of standards; and after modifying the wrapper to the checking tool to include a third set of standards and without modifying the checking tool, executing the wrapper to determine whether the file is compliant with the third set of standards.

19. A method for implementing a wrapper, the wrapper being arranged to wrap a checking tool, the checking tool being arranged to determine compliance of a file with a first set of standards and not being arranged to determine compliance of a file with a second set of standards, the method comprising:

identifying a second set of standards associated with the file;

providing functionality in the wrapper to determine compliance of the file with the second set of standards in the wrapper, wherein the wrapper is stored on a fixed disk accessible by a computer processor;

interfacing the wrapper with the checking tool;

storing the interface of the wrapper with the checking tool on the fixed disk accessible by the computer processor;

in the computer processor, via the interface between the wrapper and checking tool, calling the checking tool from the wrapper;

upon calling the checking tool, executing the checking tool in the computer processor to determine compliance of the file with the first set of standards but not the second set of standards; and modifying the wrapper to provide functionality in the wrapper to determine compliance of the file with a third set of standards in the wrapper and storing the modified wrapper on the fixed disk accessible by the computer processor, wherein the third set of standards is different from the first and second set of standards; and without altering the checking tool after modifying the wrapper, executing the wrapper in the computer processor to determine compliance of the file with the third set of standards.

20. The method of claim 19 comprising:

executing the wrapper in the computer processor to determine compliance of the file with the second set of standards but not the first set of standards.

21. The method of claim 20 wherein determining compliance of the file with the first set of standards occurs during the determining compliance of the file with the second set of standards.

22. The method of claim 19 wherein the checking tool comprises compiled binary code and the wrapper comprises a script.

* * * * *